United States Patent [19]
Hurd, Jr. et al.

[11] 4,311,005
[45] Jan. 19, 1982

[54] ROCKET MOTOR

[75] Inventors: Wallace A. Hurd, Jr., Bedford; Fred R. Youngren, Lexington, both of Mass.

[73] Assignee: Raytheon Company, Lexington, Mass.

[21] Appl. No.: 38,366

[22] Filed: May 11, 1979

[51] Int. Cl.³ .......................... F02K 9/14; F02K 9/38
[52] U.S. Cl. ...................................... 60/253; 102/531; 102/284
[58] Field of Search ...................... 60/271, 253, 39.47; 102/49.3, 99–103

[56] References Cited
U.S. PATENT DOCUMENTS

| | | | |
|---|---|---|---|
| 694,295 | 2/1902 | Maxim | 102/100 |
| 952,538 | 3/1910 | Luciani | 102/99 |
| 3,898,934 | 8/1975 | Mercier | 102/100 |
| 3,991,683 | 11/1976 | Rentzsch et al. | 102/493 |

FOREIGN PATENT DOCUMENTS 1268781  6/1961  France ................................ 60/271

*Primary Examiner*—Harold J. Tudor
*Attorney, Agent, or Firm*—Philip J. McFarland; Joseph D. Pannone

[57] ABSTRACT

An improved rocket motor using a solid propellant is shown to include a perforate shield disposed between a combustion chamber and a nozzle to prevent any portion of the solid propellant from entering the nozzle during operation.

2 Claims, 2 Drawing Figures

ROCKET MOTOR

BACKGROUND OF THE INVENTION

This invention pertains generally to rocket motors and particularly to motors of such type which use a solid propellant.

It has been known in the art that a rocket motor using a solid propellant formed as a so-called scroll is susceptible to failure in operation, especially when the ambient temperature is high. For example, at various times to date during the almost fifteen year life of the DRAGON missile, catastrophic failures have been experienced by reason of such failures in rocket motors used to maneuver the missile during operation.

SUMMARY OF THE INVENTION

With the foregoing in mind it is a primary object of this invention to provide an improved rocket motor using a solid propellant formed in a scroll, such motor being operable in high ambient temperatures without danger of catastrophic failure.

The foregoing and other objects of this invention are generally attained by providing, in a rocket motor using solid propellant formed in a scroll and disposed within a combustion chamber adjacent to a nozzle, a perforate member positioned between such chamber and nozzle to prevent any unburned portion of the solid propellant from entering the nozzle, such perforate member having an insignificant effect on the flow of combustion gases through the nozzle.

BRIEF DESCRIPTION OF THE DRAWINGS

For a more complete understanding of this invention reference is made to the accompanying description of a preferred embodiment of this invention as illustrated in the accompanying drawings, wherein.

DESCRIPTION OF THE PREFERRED EMBODIMENTS

Figure 1:
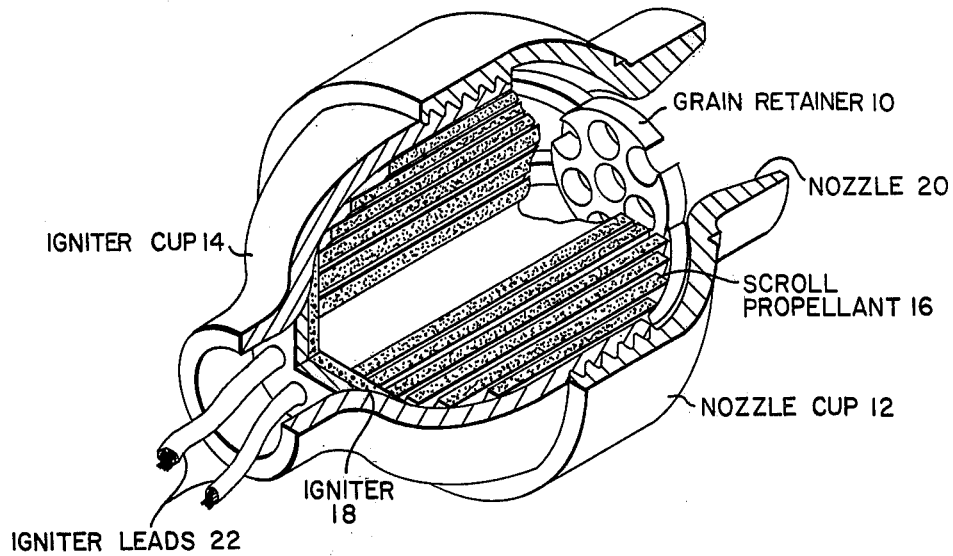
FIG. 1 is an isometric view, partially cut away, showing a preferred embodiment of a rocket motor according to this invention.

Referring now to FIG. 1, it may be seen that the illustrated embodiment of our rocket motor includes a conventional arrangement of elements, plus a perforate element (referred to hereinafter as the grain retainer 10), making up such a motor. Thus, there the illustrated rocket motor is made up of a first and a second member (referred to hereinafter respectively as the nozzle cup 12 and the igniter cup 14) appropriately shaped to form, when mated as shown, a combustion chamber (not numbered) in which a "scroll" propellant 16, an igniter 18 and the grain retainer 10 are mounted. A nozzle 20 is integrally formed with the nozzle cup 12 and igniter leads 22 disposed as shown to pass through the igniter 18 in response to a firing signal from a source (not shown).

The scroll propellant 16 is coiled so that, at normal ambient temperatures, i.e. temperatures less than 25°, the outside of the scroll propellant fits loosely within the combustion chamber. The scroll propellant here is type M-36 double-base propellant manufactured by Hercules Radford Arsenal, Radford, Virginia, and is made up of nitroglycerin nitrocelulose. At high ambient temperatures, i.e. temperatures above 100° F., the scroll propellant 16 expands enough so that its outside fits snugly in the combustion chamber.

The igniter 18 here is of the electrical bridgewire type with 7.5 $\Omega$ resistance. The explosive prime mix is a lead styphnate-potassium perchlorate mixture, while the secondary mix is a zirconium powder, potassium perchlorate and barium nitrate mixture. The manufacturer is Quantic Products, 990 Commercial Street, San Carlos, Calif. 94070 or Space Ordnance Systems, Militas, Calif. 95131. The igniter is designed for fast and reproducible ignition time.

The grain retainer 10 here is fabricated in any conventional manner using a single piece of 305, half hard, stainless steel to provide a perforate base (not numbered) and a plurality of resilient fingers (not numbered) outwardly extending from points around the periphery of the perforate base. The perforate base and resilient fingers are dimensioned so that, when installed in the nozzle cup 12, such base overlies the nozzle throat 20T of the nozzle 20 and such fingers prevent movement of such base during operation. The number and locations of the perforations in the perforate base may be changed as desired so long as, during operation, flow of combustion gases from the combustion chamber through the nozzle throat 20T and nozzle 20 is not significantly impeded and the structural integrity of the grain retainer 10 is maintained. To increase the strength of the grain retainer 10 it is preferred (as shown more clearly in FIG. 2) that the perforate base be slightly crowned.

Figure 2:
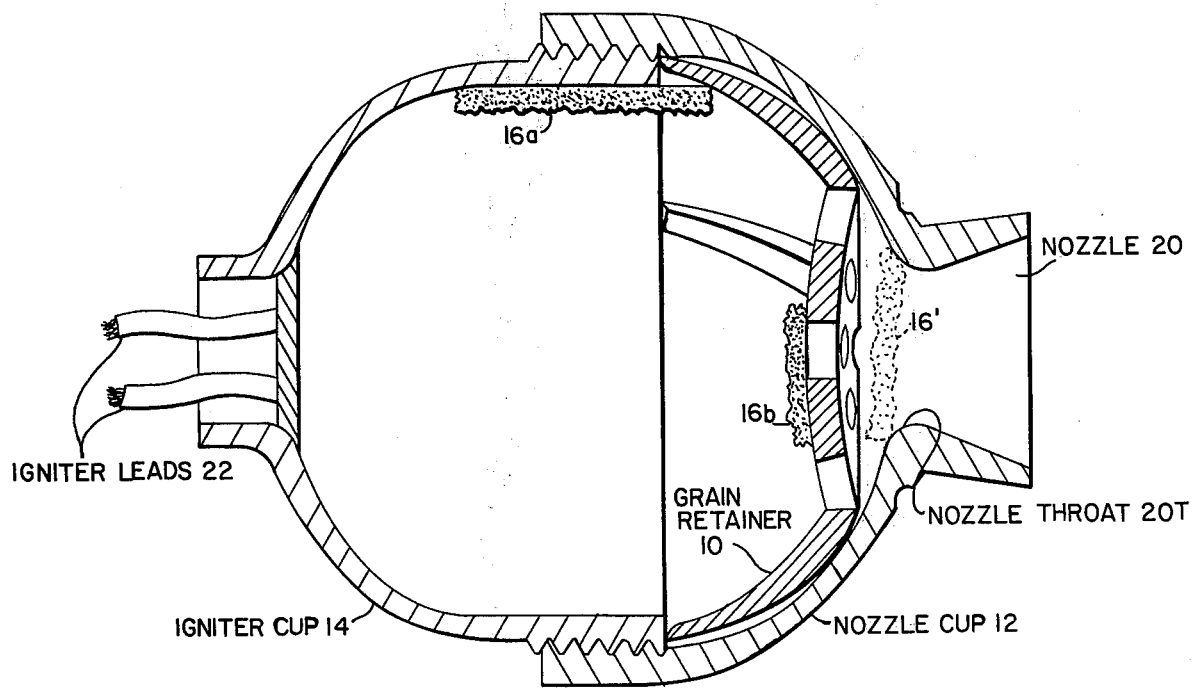
FIG. 2 is a longitudinal cross-section of the rocket motor of FIG. 1 showing how catastrophic failure is avoided.

Referring now to FIG. 2, the reason for catastrophic failure of a conventional rocket motor and the way in which the contemplated arrangement obviates the possibility of such a failure may be seen. Thus, in FIG. 2 it may be seen that at high ambient temperatures when combustion of the scroll propellant 16 (FIG. 1) is almost complete, a portion (here numbered 16a) of the outer layer of such propellant has been forced initially by the pressure of the combustion gases generated during combustion of the already burned scroll propellant 16 to remain against the inner surface of the combustion chamber. Consequently, burning of the portion 16a may take place only from the surface not in contact with the inner surface of the combustion chamber. Before burning of the portion 16a may be completed, the still to be burned part (shown in dotted line and numbered 16') may be lifted from the inner surface of the combustion chamber by the combustion gases and blown into the nozzle throat 20T to block the flow of combustion gases and blown into the nozzle throat 20T to block the flow of combustion gases therethrough. Almost instantaneously, then, the pressure of the combustion gases within the combustion chamber builds up to exceed the maximum pressure which may be contained by the igniter cup 14 or the nozzle cup 12. A catastrophic failure than occurs.

With the grain retainer 10 in place, any unburned part of the outer portion (here shown in dashed line and numbered 16b) of the scroll propellant 16 (FIG. 1) which may be separated from the inner wall of the combustion chamber is blown against the base of the grain retainer 10. Only in the almost impossible case when the unburned portion simultaneously covers every opening in the base of the grain retainer 10 would the flow of combustion gases be blocked; in every other possible case hot combustion gases are present on both sides of the unburned portion with the result that complete combustion occurs without any significant blockage of the flow of combustion gases or any appreciable rise in pressure within the combustion chamber.

What is claimed is:

1. In a rocket motor having a combustion chamber and a nozzle leading from such chamber to form a jet of combustion gases from burning of a solid propellant initially disposed, in the form of a coiled strip, within such chamber, the improvement comprising a perforate shield with a plurality of outwardly extending resilient fingers formed integrally with, and around the periphery of, such shield to frictionally engage the inner wall of the combustion chamber adjacent to the throat of the nozzle thereby to maintain such shield in position between the solid propellant and the nozzle.

2. The improvement as in claim 1 wherein the perforate shield is crowned toward the combustion chamber.